United States Patent
Kang

(10) Patent No.: US 6,951,110 B2
(45) Date of Patent: Oct. 4, 2005

(54) ANNULAR RECUPERATOR DESIGN

(75) Inventor: Yungmo Kang, Los Angeles, CA (US)

(73) Assignee: Capstone Turbine Corporation, Chatsworth, CA (US)

(*) Notice: Subject to any disclaimer, the term of this patent is extended or adjusted under 35 U.S.C. 154(b) by 599 days.

(21) Appl. No.: 09/966,514

(22) Filed: Sep. 27, 2001

(65) Prior Publication Data
US 2002/0080633 A1 Jun. 27, 2002

Related U.S. Application Data

(60) Provisional application No. 60/246,129, filed on Nov. 6, 2000.

(51) Int. Cl.[7] ................................................. F02C 7/10
(52) U.S. Cl. .......................... 60/772; 60/39.511; 165/4
(58) Field of Search ............................. 60/39.511, 772; 165/4

(56) References Cited

U.S. PATENT DOCUMENTS

| | | |
|---|---|---|
| 2,650,073 A | 8/1953 | Holm |
| 3,831,374 A | 8/1974 | Nicita |
| 4,213,297 A * | 7/1980 | Forster et al. ........... 60/39.511 |
| 5,050,668 A | 9/1991 | Peterson et al. |
| 6,438,936 B1 * | 8/2002 | Ryan ....................... 60/39.511 |

FOREIGN PATENT DOCUMENTS

| | | |
|---|---|---|
| WO | 0933609 A1 | 4/1999 |
| WO | 9923435 | 5/1999 |

* cited by examiner

Primary Examiner—Louis J. Casaregola
(74) Attorney, Agent, or Firm—Waddey & Patterson; Lucian Wayne Beavers

(57) ABSTRACT

An annular heat recuperator is formed with alternating hot and cold cells to separate counter-flowing hot and cold fluid streams. Each cold cell has a fluid inlet formed in the inner diameter of the recuperator near one axial end, and a fluid outlet formed in the outer diameter of the recuperator near the other axial end to evenly distribute fluid mass flow throughout the cell. Cold cells may be joined with the outlet of one cell fluidly connected to the inlet of an adjacent downstream cell to form multi-stage cells.

39 Claims, 5 Drawing Sheets

US 6,951,110 B2

ANNULAR RECUPERATOR DESIGN

RELATED APPLICATIONS

This patent application claims the priority of provisional patent application Ser. No. 60/246,129, filed Nov. 6, 2000.

STATEMENT REGARDING FEDERALLY SPONSORED DEVELOPMENT

The U.S. Government has a paid-up license in this invention and the right in limited circumstances to require the patent owner to license others on reasonable terms as provided for by the terms of the Advanced MicroTurbine System Contract NO. DE-FC02-01CH11058 awarded by the Department of Energy.

BACKGROUND OF THE INVENTION

A turbogenerator electric power generation system is generally comprised of a compressor, a combustor including fuel injectors and an ignition source, a turbine, and an electrical generator. Often, the system includes a recuperator to preheat combustion air with waste heat from the turbine exhaust. The ability of the recuperator to transfer waste heat from the exhaust to the combustion air can significantly impact the efficiency of the turbogenerator system, and an efficient recuperator can substantially lower system fuel consumption. Therefore, what is needed is a recuperator for a turbogenerator system to efficiently transfer heat from turbine exhaust gas to combustion air.

BRIEF SUMMARY OF THE INVENTION

The present invention meets the above need by providing, in one aspect, an annular recuperator including a generally cylindrical annular housing defined by an inner diameter, an outer diameter, and axially opposed first and second ends; a plurality of cold cells extending radially from the inner diameter to the outer diameter in spaced-apart relationship to one another for conducting the cool fluid stream from a fluid inlet formed in the inner diameter near the second end to a fluid outlet formed in the outer diameter near the first end; and a plurality of hot cells disposed within the housing in alternating relationship with the cold cells for conducting the hot fluid stream from the first end to the second end.

In a further aspect, the present invention provides a method for transferring heat from a hot fluid stream to a counter-flowing cool fluid stream, comprising providing a generally cylindrical annular housing defined by an inner diameter, an outer diameter, and axially opposed first and second ends; providing a plurality of cold cells extending radially from the inner diameter to the outer diameter in spaced-apart relationship to one another, each cold cell including a fluid inlet formed in the inner diameter near the second end and a fluid outlet formed in the outer diameter near the first end; providing a plurality of hot cells disposed within the housing in alternating relationship with the cold cells; passing the hot fluid stream through the hot cells from the first end of the housing to the second end; and passing the cool fluid stream through the cold cells from the fluid inlets to the fluid outlets to acquire heat energy from the hot fluid stream.

In another aspect of the invention, each cold cell is formed with a generally diagonally opposite fluid inlet and outlet to substantially equalize fluid flow, fluid flow paths, and/or fluid flow resistance through the cell. Each cell may be formed with two or more coplanar stages in fluid communication with one another, and also formed with generally diagonally opposite fluid inlets and outlets. Each stage of a cell may be formed from a different material. In a yet further aspect, a system including a compressor, a combustor, and a turbine is disposed substantially within the recuperator inner diameter to provide compressed air, combust the compressed air and fuel to produce hot gas, and be driven by the hot gas to rotate the compressor, respectively, the compressed air comprising the cool fluid stream and the hot gas comprising the hot fluid stream.

DETAILED DESCRIPTION OF THE INVENTION

Figure 1:
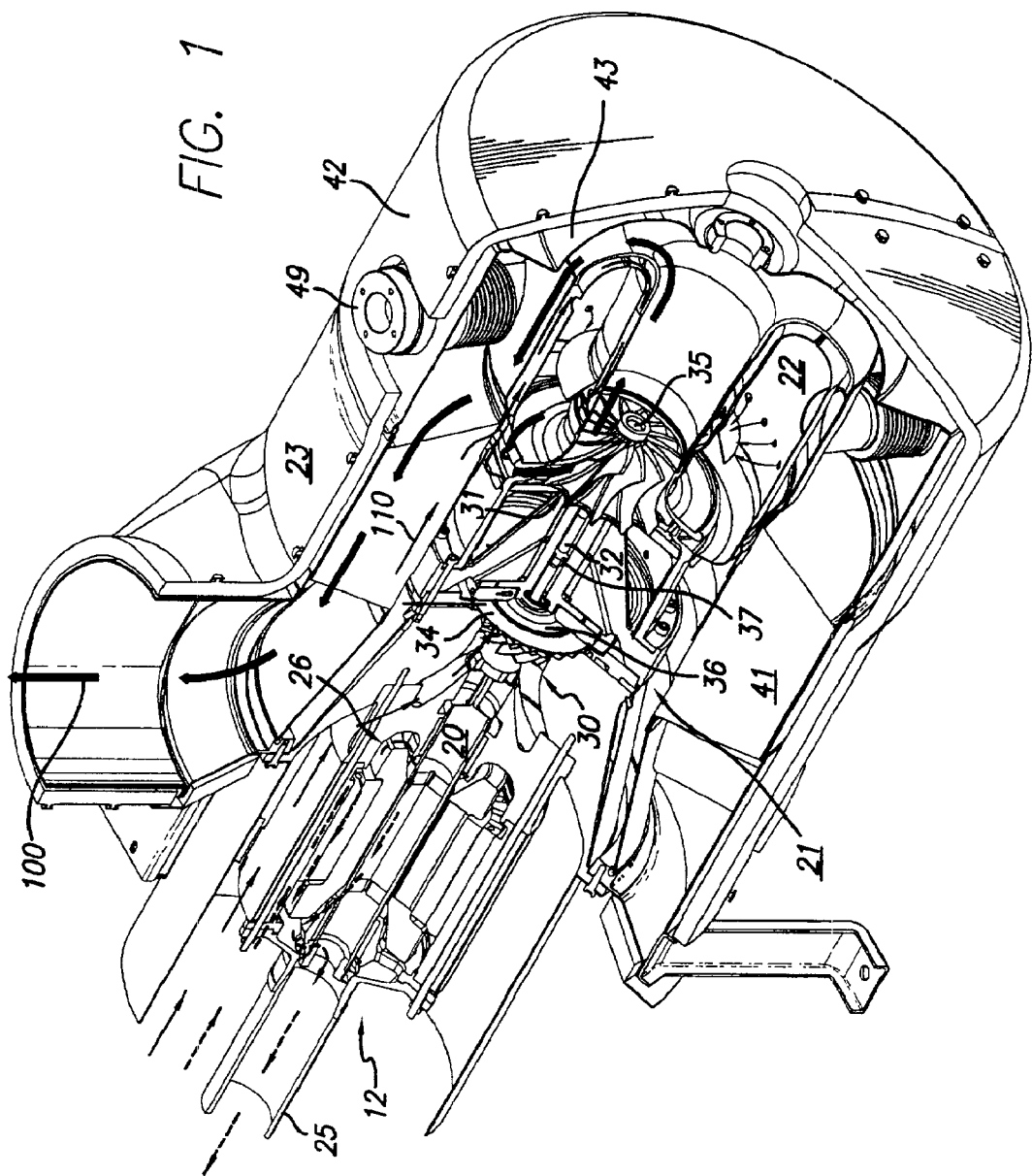
FIG. 1 is perspective view, partially in section, of a turbogenerator system with an annular recuperator according to the present invention.

Referring to FIG. 1, integrated turbogenerator system 12 generally includes generator 20, power head 21, combustor 22, and recuperator (or heat exchanger) 23. Power head 21 of turbogenerator 12 includes compressor 30, turbine 31, and bearing rotor 32. Tie rod 33 to magnetic rotor 26 (which may be a permanent magnet) of generator 20 passes through bearing rotor 32. Compressor 30 includes compressor impeller or wheel 34 that draws air flowing from an annular air flow passage in outer cylindrical sleeve 29 around stator 27 of the generator 20. Turbine 31 includes turbine wheel 35 that receives hot exhaust gas flowing from combustor 22. Combustor 22 receives preheated air from recuperator 23 and fuel through a plurality of fuel injector guides 49. Compressor wheel 34 and turbine wheel 35 are supported on bearing shaft or rotor 32 having radially extending air-flow bearing rotor thrust disk 36. Bearing rotor 32 is rotatably supported by a single air-flow journal bearing within center bearing housing 37 while bearing rotor thrust disk 36 at the compressor end of bearing rotor 32 is rotatably supported by a bilateral air-flow thrust bearing.

Generator 20 includes magnetic rotor or sleeve 26 rotatably supported within generator stator 27 by a pair of spaced journal bearings. Both rotor 26 and stator 27 may include permanent magnets. Air is drawn by the rotation of rotor 26 and it travels between rotor 26 and stator 27 and further through an annular space formed radially outward of the stator to cool generator 20. Inner sleeve 25 serves to separate the air expelled by rotor 26 from the air being drawn in by compressor 30, thereby preventing preheated air from being drawn in by the compressor and adversely affecting the performance of the compressor (due to the lower density of preheated air as opposed to ambient-temperature air).

In operation, air is drawn through sleeve 29 by compressor 30, compressed, and directed to flow into recuperator 23.

Recuperator 23 includes annular housing 40 with heat transfer section or core 41, exhaust gas dome 42, and combustor dome 43. Exhaust heat from turbine 31 is used to preheat the compressed air flowing through the recuperator before it enters combustor 22, where the preheated air is mixed with fuel and ignited in the combustor, such as by electrical spark, hot surface ignition, or catalyst. The fuel may also be premixed with all or a portion of the preheated air prior to injection into the combustor. The resulting combustion gas expands in turbine 31 to drive turbine impeller 35 and, through common shaft 32, drive compressor 30 and rotor 26 of generator 20. The expanded turbine exhaust gas then exits turbine 31 and flows through recuperator 23 before being discharged from turbogenerator 12.

Recuperator 23 as shown in FIG. 1 is formed in an annular configuration that essentially surrounds the compressor and turbine of the turbogenerator. Various other recuperator designs, however, are currently known and may be employed by turbogenerator system 12. As discussed below in detail, the present invention recognizes that a problem to be solved for providing an efficient recuperator is promoting evenly distributed fluid mass flows throughout the recuperator to maximize the amount of heat energy transferred to the cool fluid stream (e.g. combustion air) from the hot fluid stream (e.g. the turbine exhaust).

Recuperator 23 receives, channels, and transfers heat from hot fluid stream 100 (comprised of the turbine exhaust gas) to cool fluid stream 110 (comprised of the compressed air from compressor 30). To increase its efficiency, recuperator 23 maximizes the thermal intermixing of the two streams while keeping the streams physically separate and also minimizing the flow resistance encountered by the two streams. Recuperator 23 thus includes a plurality of low temperature, high pressure "cold" cells disposed adjacent to high temperature, low pressure "hot" cells in an alternating pattern repeated over the entire diameter of the recuperator core.

Figure 2:
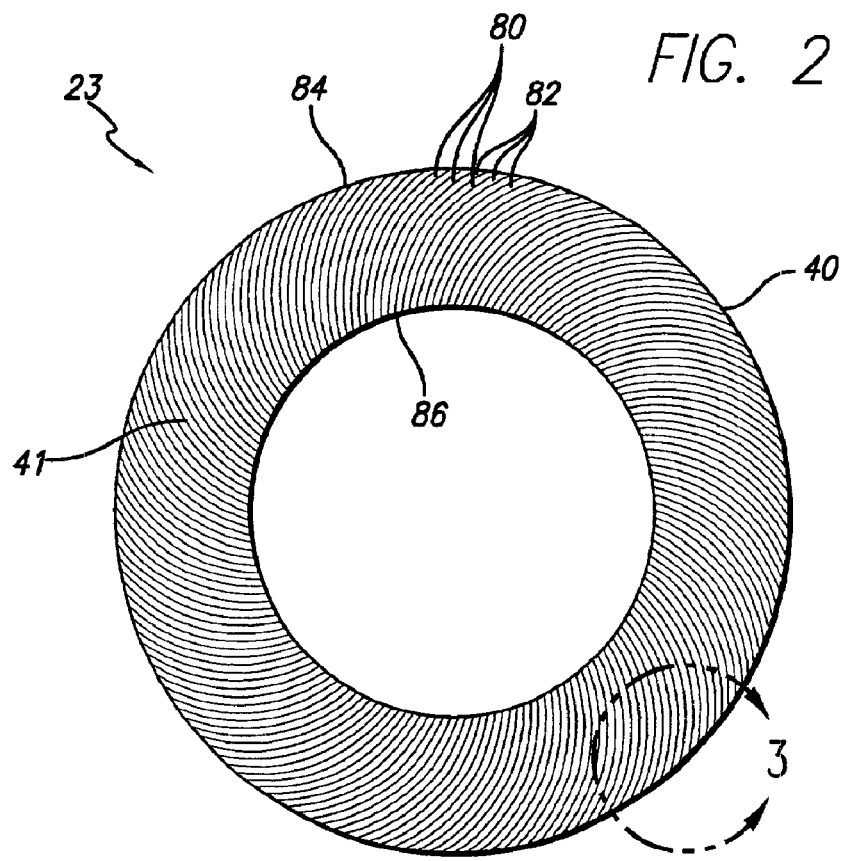
FIG. 2 is a diagram showing in cross section the spacing and placement of cold and hot cells in the annular recuperator of FIG. 1.
Figure 3:
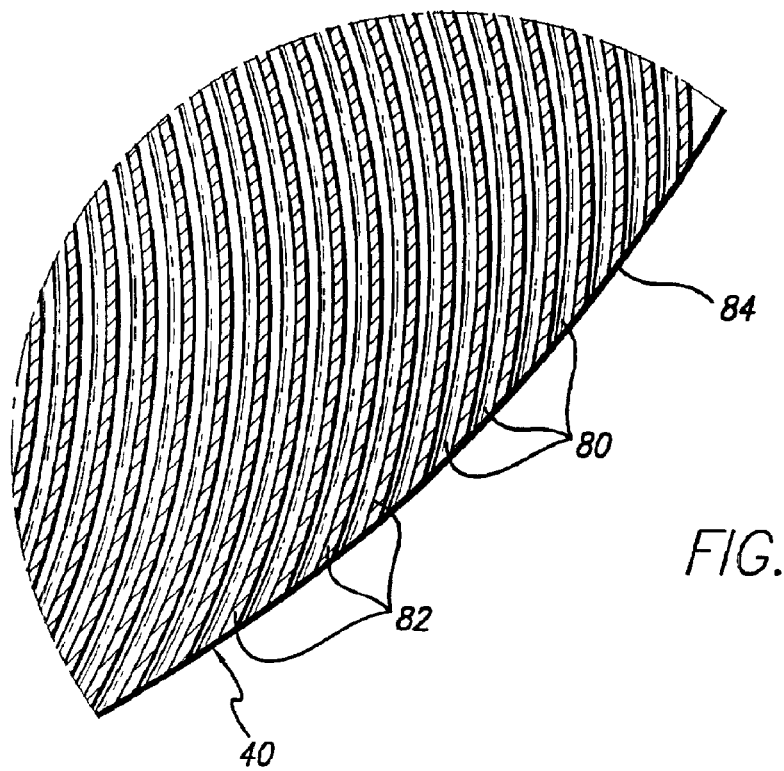
FIG. 3 is a enlarged detailed view of cold and hot cells in the annular recuperator of FIG. 2.

Referring to FIG. 2 and FIG. 3, recuperator core 41 is shown in greater detail as formed of alternating cold cells 80 and hot cells 82 disposed in an annular pattern. Hot cells 82 may be flow channels defined by neighboring cold cells 80, outer diameter 84 as defined by annular housing 40 of annular recuperator 23, and inner diameter 86. Cold cells 80 may be formed with a generally rectangular cross section and thereafter may be molded into a generally arcuate configuration. This arcuate configuration allows both cold and hot cells to maintain a relatively constant cross section along their radial length. As discussed elsewhere, protrusions extending from cold cells 80 through hot cells 82 (shown in FIGS. 4 and 5) space the cells apart. The upper edges of cold cells 80 abut annular housing 40 but are typically not connected to the housing so as to be able to move with respect to the housing as may be necessitated by thermal expansion and contraction.

Figure 4:
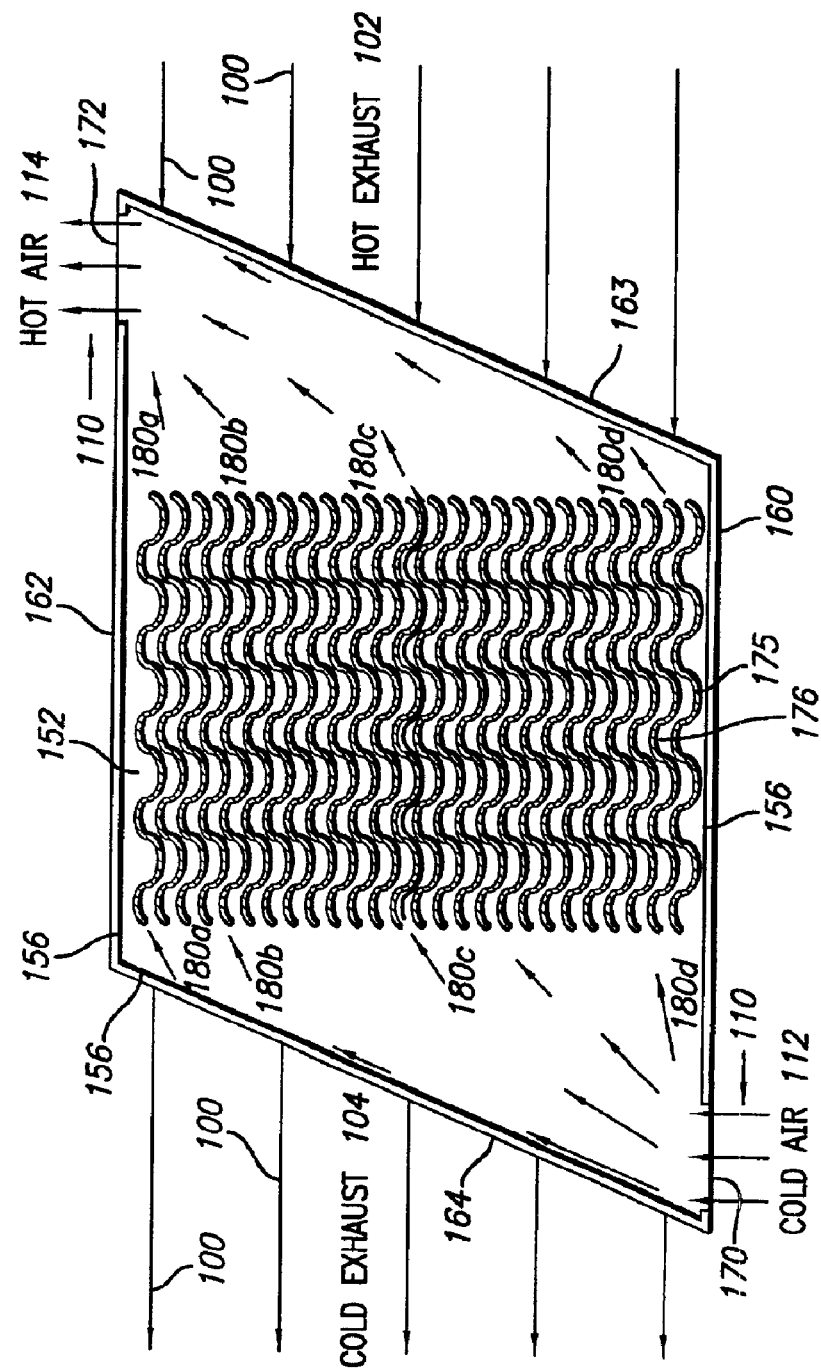
FIG. 4 is a sectional side view of a recuperator high-pressure cell according to the present invention.

Referring to FIG. 4, high-pressure, low-temperature cold cell 80 is formed with two heat transfer surfaces spaced apart from one another. Cold cell 80 includes heat transfer surface 152 in the general shape of a parallelogram, defined by opposite pairs of generally parallel edges including inner edge 160 and outer edge 162, and angled edges 163 and 164. Lip 156 extends along the entire perimeter of cell 80 to space apart the two heat transfer surfaces of the cell (the second surface is not shown for clarity and to illustrate the inner elements of the cell). Lip 156 is interrupted at one axial end of inner edge 160 to form compressed air inlet 170 and is further interrupted at the opposite axial end of outer edge 162 to form compressed air outlet 172.

A pattern of convolute protrusions 175 may be defined to extend from both heat transfer surfaces of cold cell 80 and abut one another to define convolute flow channels 176 therebetween for maximizing thermal intermixing of compressed air 110 with counter-flowing exhaust gas 100. Low-pressure, high temperature hot cells 82 disposed between high-pressure, low temperature cold cells 80 can be of any practicable design, including the axial flow path design briefly described above wherein exhaust gas stream 100 enters, flows along, and exits along a relatively axial flow path without any significant turns in the flow path.

Cold cells 80 are disposed with inner edges 160 extending axially along the axis of turbogenerator 12 adjacent to the inner diameter of annular housing 40 and with outer edges 162 adjacent to the outer diameter of annular housing 40 (as shown in FIGS. 2 and 3). Air inlets 170 of the plurality of cold cells 80 thus form an annular ring pattern surrounding compressor impeller 34 to receive cool compressed air 112 from compressor 30, such as through a manifold (not shown). Cool compressed air 112 entering each cold cell 80 can then follow any one of multiple flow paths 180 (shown as flow paths 180a, b, c, d for illustration purposes only) extending from air inlet 170 through convolute channels 176 to exit air outlet 172 as hot compressed air 114.

As shown in FIG. 4, substantially all linear flow paths 180 are substantially equal in length from air inlet 170 to air outlet 172, and thus present substantially equal flow resistance to the flowing air to substantially equalize air mass flow throughout the cell. An additional benefit offered by this configuration is that cold cells 80 can be increased in the radial direction with no theoretical limitation because substantially all flow paths will remain substantially equal.

As shown in FIG. 1, the final destination of compressed air stream 110 is combustor 22 located within the annular space of recuperator annular housing 40. Passage 181 defined by wall 182 conducts hot compressed air 114 from outlet 172 to combustor 22. To avoid the use of passage 181 or other types of additional ducting that may be required to conduct hot compressed air 114 from cold cell outlets 172, a multiple-stage cold cell configuration may be used.

Figure 5:
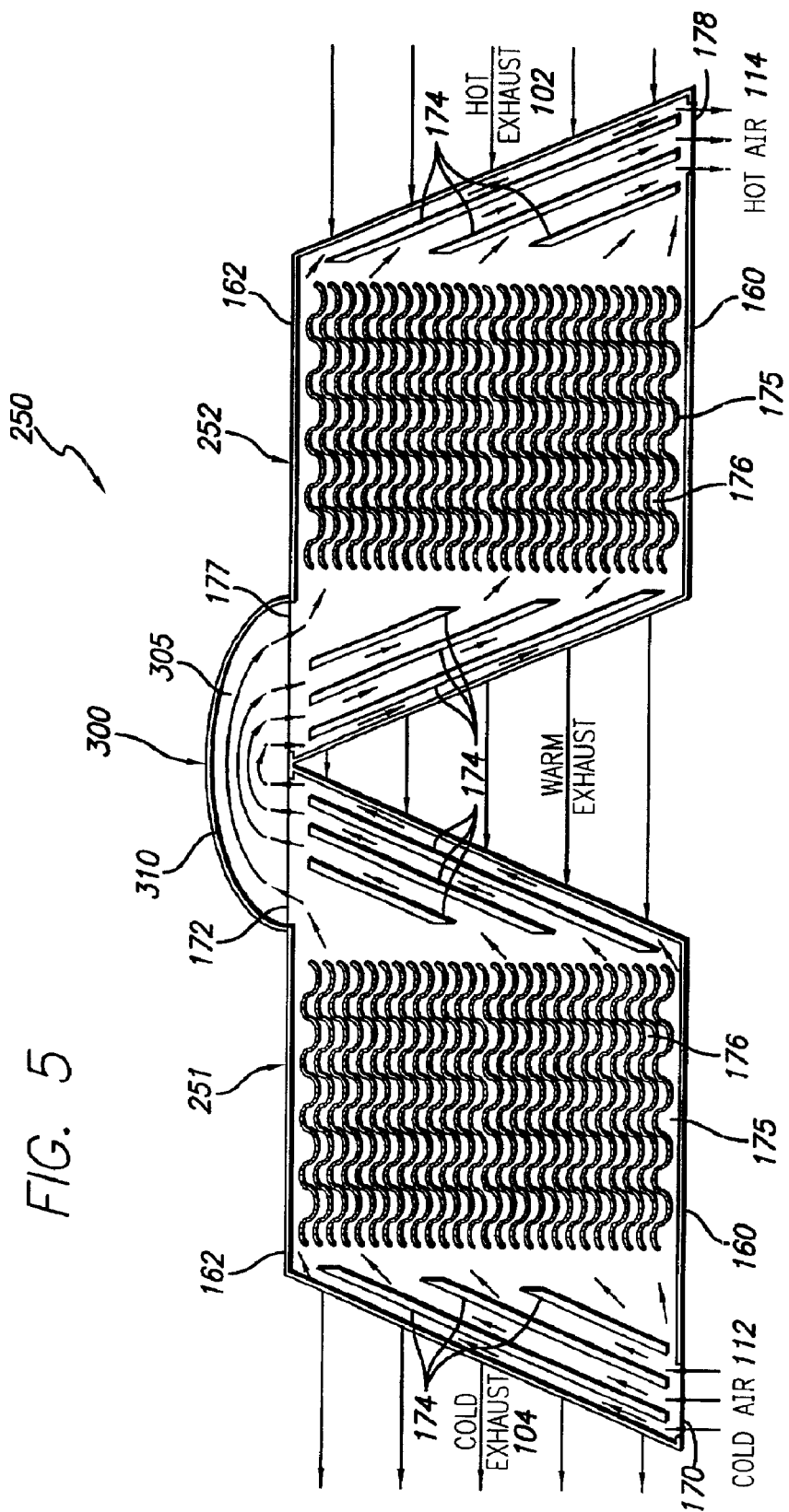
FIG. 5 is a sectional side view of a recuperator high-pressure two-stage cell according to the present invention.

Referring to FIG. 5, two-stage heat transfer cell 250 includes first stage 251 and second stage 252 disposed in coplanar relationship to first stage 251. Both stages 251 and 252 may be identical in construction, with second stage 252 essentially a mirror image of the first stage, i.e. oriented at 180 degrees to the first stage. First and second stages 251, 252 may also be different, such as have different dimensions or be formed with different inner flow channels. In the particular embodiment of FIG. 5, first stage 251 is similar to the embodiment of FIG. 4 described elsewhere, and includes air inlet 170, air outlet 172, and convolute flow channels 176. First stage 251 further includes directional channels 174 extending between air inlet 170 and convolute channels 176, and between air outlet 172 and convolute channels 176. The purpose of directional channels 174 is to aid the radial distribution of air flow between inner edge 160 and outer edge 162 by directing air flow 112 entering inlet 170.

Second stage 252 is formed with air inlet 177 at the axial end of outer edge 162 abutting air outlet 172 of first stage 251, and with air outlet 178 at the axially opposite end of inner edge 160. In all other aspects second stage 252 is identical to first stage 251 and is essentially a mirror copy oriented 180 degrees to, and coplanar with, first stage 251.

Intermediate flow channel 305 is defined between first stage 351 and second stage 352 by duct 300 extending from first stage outlet 172 to second stage inlet 177. Duct 300 may be formed in any shape that is practicable within the geometric confines of the overall system, and may extend along the outside of recuperator annular housing 40 or alternatively may be completely or partially contained within the housing. Ideally, intermediate flow channel 305 will offer minimal flow resistance to air flowing through cell 250.

Cool compressed air 112 enters first stage air inlet 170, follows any one of a plurality of substantially equal flow paths through convolute channels 176 as described previously with respect to the embodiment shown in FIG. 4, and exits through first stage outlet 172 into intermediate flow channel 305. The air continues to flow through intermediate flow channel 305 and into second stage 252 through second stage inlet 177, where it once again follows any of a plurality of substantially equal flow paths through convolute channels 176 to eventually exit as hot compressed air 114 through second stage air outlet 178.

The two-stage design described above minimizes the need for additional air flow ducting, such as passage 181 shown in FIG. 1, that would otherwise be required to conduct hot compressed air 114 to combustor 22, and employs instead relatively short-length intermediate flow channel 305. By utilizing two stages, even air mass flow distribution is maintained throughout the cell 250 to increase the overall recuperator heat transfer effectiveness and efficiency. Furthermore, the cost of manufacturing a larger-capacity recuperator is minimized by using identical building blocks (i.e. the single cell embodiment of FIG. 4) joined together end to-end.

First stage 251 may be formed from materials typically used in such applications, such as stainless steel, while second stage 252 may be formed from a more heat-resistant alloy. Second stage 252 will typically be exposed to higher temperatures than first stage 251 because exhaust gas 102 flowing by the first stage will already have experienced some cooling from cool compressed air 112 flowing through the second stage. By using a two-stage design, high-temperature alloys may be employed only in the areas of the recuperator experiencing the highest temperatures, thus realizing substantial manufacturing cost savings.

Although the invention has been described with reference to particular embodiments, these embodiments are offered merely for illustration and ease of discussion of the general inventive concept. Numerous modifications and additions may be made to the embodiments described herein without departing from the scope and spirit of the invention. Thus, the invention may used with any other fluid capable of carrying heat, and is not limited solely to air or solely to gases. The two-stage design may be extended to include any number of stages wherein the fluid outlet of each upstream cell is substantially adjacent to and in fluid communication with the fluid inlet of the adjacent downstream cell. Furthermore, although the invention has been described within the context of an annular recuperator wherein the counter-flowing hot exhaust stream moves along generally axial paths from inlet to outlet, other hot stream flow paths may be practiced together with the invention, including recuperators where the low-pressure hot stream cells are formed according to the present inventive concept and are thus similar to the high-pressure cool stream cells. Practice of the invention is also not limited solely to counter-flow current recuperator designs.

Figure 6:
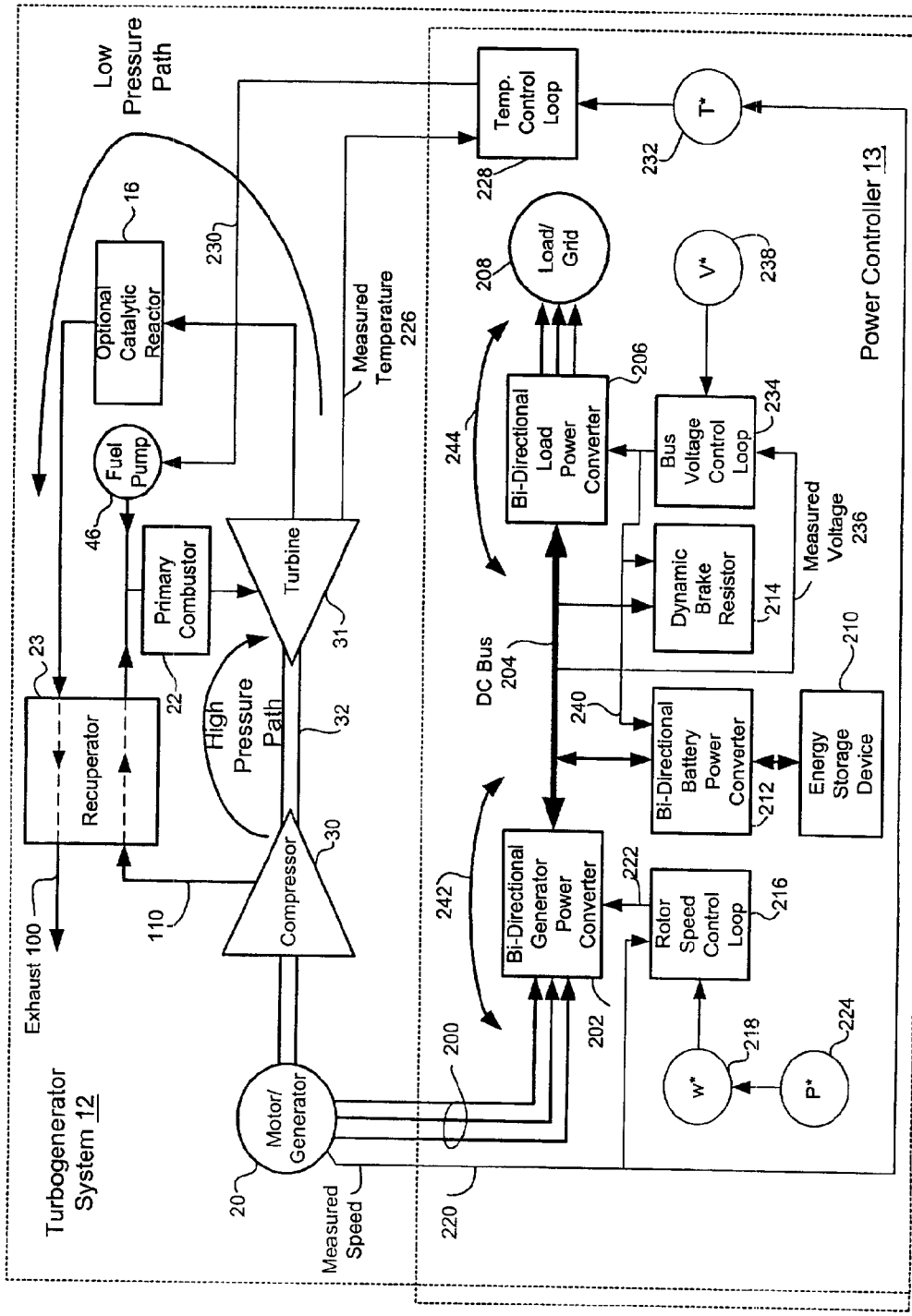
FIG. 6 is a functional diagram showing the turbogenerator of FIG. 1 and an associated power controller.

Referring to FIG. 6, integrated turbogenerator system 12 incorporates power controller 13, which applies AC output 200 from motor/generator 20 to bi-directional generator power converter 202. Power converter 202 is connected to DC bus 204 and includes a series of computer operable switches, such as IGBTs, that are selectively operated as an AC to DC converter to apply a selected amount of power from AC output 200 to DC bus 204, or as a DC to AC converter to apply a selected amount of power from DC bus 204 to generator power converter 202. Generator power converter 202 is therefore selectively operable to transfer power or current in and out of motor/generator 20, thereby changing the torque applied therefrom to common shaft 32. A more detailed description of an appropriate power controller is disclosed in U.S. Pat. No. 6,487,096, issued on Nov. 26, 2002, in the names of Gilbreth, Wacknov and Wall and assigned to the assignee of the present application, and which is incorporated herein in its entirely by reference thereto.

Bi-directional load power converter 206, operating as a DC to AC converter, applies DC power to DC bus 204 to provide to load/grid 208. If load/grid 208 includes a source of energy, load power converter 206 may operate as an AC to DC or a DC to DC converter to apply power from load/grid 208 to DC bus 204. In particular, load/grid 208 may be an AC utility grid from which power may also be applied to DC bus 204 via load power converter 206 when integrated turbogenerator system 12 is operated to support a utility grid. Load/grid 208 may be an AC or DC load when integrated turbogenerator system 12 is operated in a stand alone mode. Similarly, load/grid 208 may be a combination of an AC or DC load and a utility grid when integrated turbogenerator system 12 is operated in an UPS or uninterruptable power supply mode.

Power may also be applied to DC bus 204 from energy storage device 210 via bi-directional battery power converter 212 operating as a DC to DC converter. For example, battery power converter 212 may apply power from DC bus 204 to energy storage device 210 for off-loading power from DC bus 204 and/or for recharging energy storage device 210. Additionally, power may also be off-loaded from DC bus 204 via dynamic brake resistor 214 connected thereto.

During operation of integrated turbogenerator system 12, the speed of common shaft 32 (and therefore the rotor speed of motor/generator 20 as well as the rotational or engine speed of both compressor 30 and turbine 31) is controlled by rotor speed control loop 216. Speed control loop 216 receives a speed command or speed setpoint from speed command W* 218 as well as speed measurement 220 from motor/generator 20, compressor 30, turbine 31, or common shaft 32. Speed control loop 216 may preferably operate as a closed loop feedback control which applies the difference between speed command W* 218 and speed measurement 220 as speed error signal 222 as a control signal to generator power converter 202.

If speed error signal 222 indicates that rotor speed should be reduced, generator power converter 202 increases the amount of power applied from motor/generator 20 via AC output 200 to DC bus 204 increasing the load on motor/generator 20 which increases the torque load on common shaft 32, which reduces the speed of common shaft 32 and therefor reduces rotor speed. If speed error signal 222 indicates that rotor speed should be increased, generator power converter 202 decreases the amount of power applied from motor/generator 20 via AC output 200 to DC bus 204 decreasing the load on motor/generator 20 which decreases the torque load on common shaft 32. This increases rotor speed because the rotational forces applied by the exhaust gases from primary combustor 22 to turbine 31 have not changed so that a decrease in torque load on common shaft 32 results in an increase in speed for common shaft 32.

Similarly, if speed error signal 222 indicates that rotor speed should be reduced, the amount of power applied from motor/generator 20 via AC output 200 to DC bus 204 can be increased, to increase the torque load on motor/generator 20 by increasing the load on DC bus 204 through appropriate modulation of brake resistor 214, by operation of battery power converter 212 to apply power from DC bus 204 to energy storage device 210, and/or by increasing the power applied by load power converter 206 to load/grid 208. If speed error signal 222 indicates that rotor speed should be increased, power from DC bus 204 may be applied to motor/generator 20 to operate motor/generator 20 as a motor. For example, at start up, shut down or during other transient conditions when the rotational power applied to common shaft 32 from the exhaust gases of primary combustor 22 is not sufficient to achieve or maintain the desired speed specified by speed command 218, it may be advantageous to continue the rotation of common shaft 32 at the specified speed by applying power from DC bus 204 via generator power converter 202 to motor motor/generator 20.

In a preferred embodiment, speed command 218 receives as its input power command 224 which may be provided from a user-selected power command and/or a measurement or other indication of the power being applied or to be applied by load power converter 206 to load/grid 208. In this manner, the rotor speed of integrated turbogenerator system 12 is maintained in a closed loop feedback control in accordance with the power being, or to be provided, to the load. During operation of integrated turbogenerator system 12, the operating temperature 226 of turbine 31, often measured as the turbine exhaust temperature or TET, is applied as an input to temperature feedback control loop 228 where it is compared with a temperature setpoint, such as commanded temperature T* 232, to generate temperature error or control signal 230 which is then applied to fuel pump 46. In this manner, the operating temperature of integrated turbogenerator system 12 may be regulated or controlled to a predetermined temperature by adjusting the fuel supplied to primary combustor 22, thus substantially if not completely decoupling operating temperature from turbine speed. The operating temperature may therefore be selected and maintained to optimize the operations of primary combustor 22 and/or low pressure catalytic reactor 16 without undesirable impact on actual rotor speed.

Integrated turbogenerator system 12 advantageously decouples speed and temperature control by controlling speed to a value selected in accordance with the power to be provided and by separately controlling temperature to a value selected for optimized performance (such as, for example, optimized for complete combustion of fuel and reduction of hydrocarbons in the exhaust gas). This control technique permits the operation of integrated turbogenerator system 12 at an optimized temperature and an optimized speed at many operating conditions in addition to full load, such as at start up, shut down, and during other transient conditions.

It has also been determined that the preselected operating temperatures may be advantageously different for different operating speeds. For example, it may be advantageous to select and maintain an operating temperature or temperatures for start up, shut down and transient response that are different, typically lower, than the operating temperature selected and maintain under full load conditions. Speed measurement 220 may conveniently be applied to as an input to commanded temperature T* 232 so that the regulated operating temperature may be selected in accordance with rotor speed or rotor speed ranges. It is important to note that the use of speed measurement 220 in selecting the commanded temperature T* 232 does not have the same result as adjusting the fuel flow to control speed. In integrated turbogenerator system integrated turbogenerator system 12, the temperature is maintain at values chosen by design for various operating conditions while speed is controlled to a value selected in accordance with power.

Under certain operating conditions, the decoupled speed and temperature control loops of integrated turbogenerator system 12 may well result in a situation in which the fuel flow provided by fuel pump 46 to primary combustor 22 results in the production of a higher amount of exhaust 100 being applied to turbine 31 than is required for the desired rotor speed. In this situation, excess drag or torque may then be applied by rotor speed control loop 216 to common shaft 32 beyond what is required by motor/generator 20 to produce the amount of AC output 200 required at that time by DC bus 204. Although some minor levels of efficiency may be lost under such conditions, these are transient conditions lasting a relatively short amount of time so that the overall efficiency of integrated turbogenerator system 12 remains extremely high while providing reliable operation over a relatively wide range of operating speeds.

Under the above described conditions, as well other transient conditions, it is important to maintain the voltage of DC bus 204 at a controlled and constant value. The control of the DC bus voltage 236 is provided by a further control loop, DC bus voltage control loop 234, which is substantially decoupled from the above described speed and temperature control loops. During operation of integrated turbogenerator system 12, DC bus voltage control loop 234 receives measured bus voltage 236 as an input. Measured bus voltage 236 is compared to preselected or commanded DC bus voltage V* 238 in DC bus voltage control loop 234 to generate voltage error or voltage control signal 240, which may be applied to battery power converter 212, brake resistor 214, and/or load power converter 206. If measured bus voltage 236 begins to drop, the amount of power being removed from DC bus 204 for application to load/grid 208 may be reduced by operation of load power converter 206, and/or power may be applied from load/grid 208 if an energy source is included therein, to prevent such bus voltage drop. Further, power may be applied to DC bus 204 from energy storage device 210 under the direction of battery power converter 212 to prevent bus voltage drop. If measured bus voltage 236 begins to exceed commanded DC bus voltage V* 238, power may be removed from DC bus 204 to limit the voltage increase by applying more power to DC bus 204 from load/grid 208 under the control of load power converter 206, or by applying power to energy storage device 210 under the control of battery power converter 212, and/or by dissipating excess power in brake resistor 214 which may be modulated on and off under the control of DC bus voltage control loop 234.

In summary, power controller 13 of integrated turbogenerator system 12 includes three decoupled or independent control loops in which temperature is regulated to a setpoint by varying fuel flow, power or current is added to or removed from motor/generator 20 under control of generator power converter 202 to control rotor speed to a setpoint, as indicated by bi-directional arrow 242, and bus voltage is controlled to a setpoint as generally indicated by bi-directional arrow 244 by applying or removing power from DC bus 204 under the control of load power converter 206 and from energy storage device 210 under the control of battery power converter 212. Power may also be removed from DC bus 204 by modulating the application of dynamic brake resistor 214 across DC bus 204.

A further advantage of the use of the integrated turbogenerator system topology shown in FIG. 2, when using a catalytic reactor as primary combustor 22, especially during transient conditions such as start up, is that any excess unburned hydrocarbons in the exhaust of the primary combustor 22 due to the excess of fuel resulting from the decoupling of the fuel or temperature control loops from speed and voltage control, are automatically eliminated by low pressure low pressure catalytic reactor 16.

Having now described the invention in accordance with the requirements of the patent statutes, those skilled in the art will understand how to make changes and modifications to the disclosed embodiments to meet their specific requirements or conditions. Such changes and modifications may be made without departing from the scope and spirit of the invention, as defined and limited solely by the following claims.

What is claimed is:

1. An annular recuperator for transferring heat from a hot fluid stream to a cool fluid stream, comprising:

generally cylindrical annular housing defined by an inner diameter and an outer diameter, the housing having axially opposed first and second ends;

a plurality of cold cells extending generally radially from the inner diameter to the outer diameter in spaced-apart relationship to one another, each cold cell having at least a first stage for conducting the cool fluid stream from a first stage fluid inlet formed in the inner diameter near the second end to a first stage fluid outlet formed in the outer diameter nearer the first end than the second end; and a plurality of hot cells disposed within the housing in alternating relationship with the cold cells for conducting the hot fluid stream from the first end to the second end.

2. The annular recuperator of claim 1, wherein said first stage fluid inlet of each cold cell is located generally diagonally opposite said first stage fluid outlet to substantially equalize fluid flow through the first stage of the cell.

3. The annular recuperator of claim 1, wherein each hot cell comprises:

an open passage defined between the two adjacent cold cells.

4. The annular recuperator of claim 2 or 3, wherein each cold cell further comprises:

a pair of substantially parallel, spaced-apart surfaces; and a plurality of flow partitions extending between the surfaces to define flow channels for conducting the cool fluid stream in a generally axial direction from the first stage fluid inlet toward the first stage fluid outlet.

5. The annular recuperator of claim 4, wherein each cold cell further comprises:

directional channels extending from the first stage fluid inlet and the first stage fluid outlet toward the flow channels to conduct the cool fluid stream from the first stage fluid inlet and to the first stage fluid outlet, respectively.

6. The annular recuperator of claim 5, wherein:

the directional channels substantially equalize fluid flow paths through the respective cold cell.

7. The annular recuperator of claim 1, wherein each cold cell further comprises:

a second stage extending radially from the inner diameter to the outer diameter and coplanar with the first stage, the second stage including a second stage fluid inlet formed in the outer diameter and in communication with the first stage fluid outlet, and further including a second stage fluid outlet formed in the inner diameter near the first end.

8. The annular recuperator of claim 1, wherein each cold cell comprises:

a plurality of coplanar, axially aligned stages extending radially from the inner diameter to the outer diameter, each stage including a fluid inlet and a generally diagonally opposed fluid outlet, each stage having at least one of the inlet or the outlet in fluid communication with the outlet or the inlet, respectively, of an adjacent stage.

9. The annular recuperator of claim 7 or 8, wherein the stage at the first end is formed from a different material than the other stages.

10. The annular recuperator of claim 7, wherein the second stage is formed from a high-temperature alloy and the first stage is formed from a stainless steel.

11. A method for transferring heat from a hot fluid stream to a counter-flowing cool fluid stream, comprising:

(a) providing a generally cylindrical annular housing defined by an inner diameter and an outer diameter, the housing having axially opposed first and second ends;

(b) providing a plurality of cold cells extending radially from the inner diameter to the outer diameter in spaced-apart relationship to one another, each cold cell including at least a first stage having a first stage fluid inlet formed in the inner diameter near the second end and a first stage fluid outlet formed in the outer diameter nearer the first end than the second end;

(c) providing a plurality of hot cells disposed within the housing in alternating relationship with the cold cells;

(d) passing the hot fluid stream through the hot cells from the first end of the housing to the second end; and (e) passing the cool fluid stream through the cold cells from the first stage fluid inlets to the first stage fluid outlets to acquire heat energy from the hot fluid stream.

12. The method of claim 11, wherein:

in step (b), said first stage fluid inlet of each cold cell is located generally diagonally opposite said first stage fluid outlet in each cold cell to substantially equalize fluid flow through the first stage of the cell.

13. The method of claim 11, wherein step (b) comprises:

providing said first stage fluid inlet generally diagonally opposite said first stage fluid outlet to substantially equalize fluid flow paths through the first stage of the cell.

14. The method of claim 11, wherein in step (c) each hot cell comprises:

an open passage defined between two adjacent cold cells.

15. The method of claim 12, wherein in step (b) each cold cell further comprises:

a pair of substantially parallel, spaced-apart surfaces; and a plurality of flow partitions extending between the surfaces to define flow channels for conducting the cool fluid stream in a generally axial direction from the first stage fluid inlet toward the first stage fluid outlet.

16. The method of claim 15, wherein in step (b) each cold cell further comprises:

directional channels extending from the first stage fluid inlet and the first stage fluid outlet toward the flow channels to conduct the cool fluid stream from the first stage fluid inlet and to the first stage fluid outlet, respectively.

17. The method of claim 16, wherein in step (b)
said directional channels substantially equalize fluid flow paths through the respective first stage of each cold cell.

18. The method of claim 11, wherein step (b) further comprises:
providing each cold cell with a second stage extending radially from the inner diameter to the outer diameter and coplanar with the first stage, the second stage including a second stage fluid inlet formed in the outer diameter and in communication with the first stage fluid outlet, and further including a second stage fluid outlet formed in the inner diameter near the first end.

19. The method of claim 11, wherein step (b) further comprises:
providing each cold cell with a plurality of coplanar, axially aligned stages extending radially from the inner diameter to the outer diameter, each stage including a fluid inlet and a generally diagonally opposed fluid outlet, each stage having at least one of the inlet or the outlet in fluid communication with the outlet or the inlet, respectively, of an adjacent stage, said first stage being one of said plurality of stages.

20. The method of claim 19, wherein the stage at the first end is formed from a different material than the other stages.

21. The method of claim 18, wherein the second stage is formed from a high-temperature alloy and the first stage is formed from a stainless steel.

22. A method of transferring heat from a hot fluid stream to a cold fluid stream, comprising:
providing a plurality of cold cells, each cold cell for conducting cold fluid from a respective cold cell inlet to a respective cold cell outlet over a plurality of fluid flow paths having substantially equal path lengths, wherein each cold cell comprises a plurality of coplanar, axially aligned stages extending radially from an inner diameter to an outer diameter, each stage including a fluid inlet and a generally diagonally opposed fluid outlet, each stage having at least one of the inlet or the outlet in fluid communication with the outlet or the inlet, respectively, of an adjacent stage, and wherein the stage at the first end is formed from a different material than the other stages;
providing a plurality of hot cells, each hot cell for conducting hot fluid from a respective hot cell inlet to a respective hot cell outlet over a plurality of fluid flow paths having substantially equal path lengths;
disposing the cold cells and hot cells in adjoining, alternating relationship to form an annular, generally cylindrical pattern of alternating hot and cold cells;
passing the hot fluid through the hot cells from the hot cell inlets to the hot cell outlets; and
passing the cold fluid through the cold cells from the cold cell inlets to the cold cell outlets to receive heat energy from the hot fluid.

23. The method of claim 22, wherein providing a plurality of cold cells comprises:
providing a plurality of cold cells, each for conducting cold fluid over a plurality of fluid flow paths having substantially equal fluid flow resistance.

24. The method of claim 23, wherein each hot cell comprises:
an open passage defined by the two adjacent cold cells therebetween.

25. The method of claim 22 or 24, wherein each stage of each cold cell further comprises:

a pair of substantially parallel, spaced-apart surfaces; and
a plurality of flow partitions extending between the surfaces to define flow channels for conducting the cool fluid stream in a generally axial direction from the fluid inlet of the stage toward the fluid outlet of the stage.

26. The method of claim 25, wherein each stage of each cold cell further comprises:
directional channels extending from the fluid inlet of the stage and the fluid outlet of the stage toward the flow channels to conduct the cool fluid stream from the fluid inlet of the stage and to the fluid outlet of the stage, respectively.

27. The method of claim 26, wherein:
the directional channels substantially equalize fluid flow paths through the respective stage of each cold cell.

28. The method of claim 22 or 23, wherein said plurality of coplanar, axially aligned stages of each cold cell comprises:
a first stage extending radially from the inner diameter to the outer diameter, the first stage including a fluid inlet formed in the inner diameter near the second end and an intermediate fluid outlet formed in the outer diameter; and
a second stage extending radially from the inner diameter to the outer diameter and coplanar with the first stage, the second stage including an intermediate fluid inlet formed in the outer diameter and in communication with the intermediate fluid outlet, and further including a fluid outlet formed in the inner diameter near the first end.

29. The method of claim 28, wherein the second stage is formed from a high-temperature alloy and the first stage is formed from a stainless steel.

30. A system, comprising:
a combustor for combusting compressed air and fuel to generate hot gas;
a turbine driven by the hot gas and having an outlet for the hot gas;
a compressor with an outlet, the compressor rotationally coupled to the turbine to compress air for the combustor; and
an annular recuperator for transferring heat from the hot gas to the compressed air, the recuperator comprising:
a generally cylindrical annular housing defined by an inner diameter substantially overlying the turbine and the compressor, an outer diameter, and axially opposed first and second ends, the first end in communication with the turbine hot gas outlet;
a plurality of cold cells extending radially from the inner diameter to the outer diameter in spaced-apart relationship to one another, each cold cell including a first stage for conducting the compressed air from a first stage fluid inlet formed in the inner diameter near the second end and in communication with the compressor outlet to a fluid outlet formed in the outer diameter nearer the first end than the second end and in communication with the combustor; and
a plurality of hot cells disposed within the housing in alternating relationship with the cold cells for conducting the hot gas from the first end to the second end.

31. The system of claim 30, wherein:
said first stage fluid inlet of each cold cell is located diagonally opposite said first stage fluid outlet to substantially equalize fluid flow paths through the first stage of the cell.

32. The system of claim 30, wherein each hot cell comprises:
an open passage defined between two adjacent cold cells.

33. The system of claim 31 or 32, wherein each cold cell further comprises:
a pair of substantially parallel, spaced-apart surfaces; and
a plurality of flow partitions extending between the surfaces to define flow channels for conducting the compressed air in a generally axial direction from the first stage fluid inlet toward the first stage fluid outlet.

34. The system of claim 33, wherein each cold cell further comprises:
directional channels extending from the first stage fluid inlet and the first stage fluid outlet toward the flow channels to conduct the compressed air from the first stage fluid inlet and to the first stage fluid outlet, respectively.

35. The system of claim 34, wherein:
the directional channels substantially equalize fluid flow paths through the first stage of each respective cold cell.

36. The system of claim 30, wherein each cold cell further comprises:
a second stage extending radially from the inner diameter to the outer diameter and coplanar with the first stage, the second stage including a second stage fluid inlet formed in the outer diameter and in communication with the first stage fluid outlet, and further including a second stage fluid outlet formed in the inner diameter near the first end and in communication with the combustor.

37. The system of claim 30, wherein each cold cell comprises:
a plurality of coplanar, axially aligned stages extending radially from the inner diameter to the outer diameter, each stage including a fluid inlet and a generally diagonally opposed fluid outlet, each stage having at least one of the inlet or the outlet in fluid communication with the outlet or the inlet, respectively, of an adjacent stage, said first stage being one of said plurality of stages.

38. The system of claim 36 or 37, wherein the stage at the first end is formed from different material than the other stages.

39. The system of claim 36, wherein the second stage is formed from a high-temperature alloy and the first stage is formed from a stainless steel.

* * * * *